(No Model.)
J. E. EVANS.
ANTI FRICTION BEARING FOR ROLLER SKATES.
No. 316,431. Patented Apr. 21, 1885.
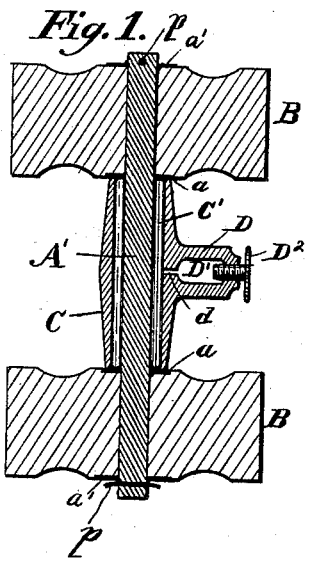
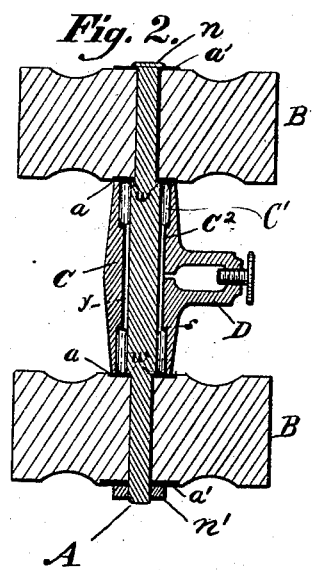
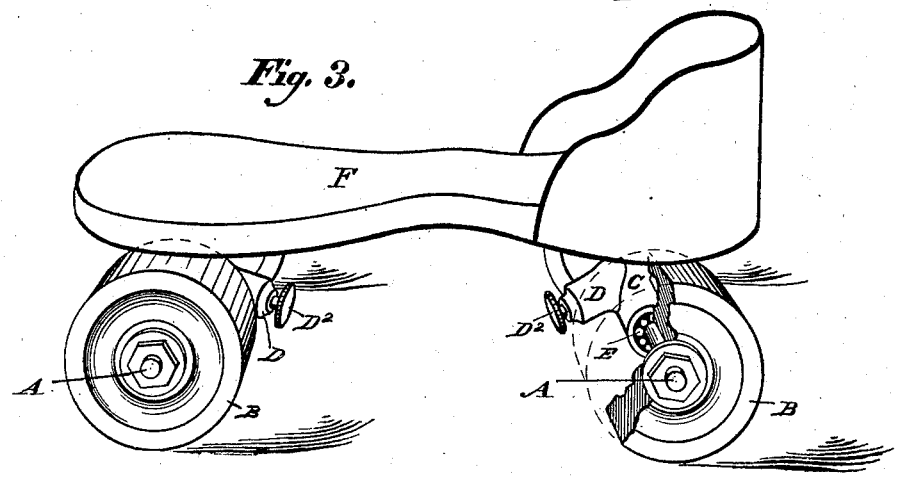
Attest.
O. M. Hill
Jno. W. Strebles
Inventor.
James E. Evans
per Wm. Hubbell Fisher
Atty.
N. PETERS. Photo-Lithographer, Washington, D. C.

United States Patent Office.

JAMES E. EVANS, OF CINCINNATI, OHIO.

ANTI-FRICTION BEARING FOR ROLLER-SKATES.

SPECIFICATION forming part of Letters Patent No. 316,431, dated April 21, 1885.

Application filed January 29, 1885. (No model.) Patented in Canada February 13, 1885, No. 21,097.

*To all whom it may concern:*

Be it known that I, JAMES E. EVANS, a citizen of the United States, residing at Cincinnati, Hamilton county, Ohio, have invented certain new and useful Improvements in Anti-Friction Bearings for Roller-Skates, of which the following is a specification.

My invention relates to that class of frictional bearings in which a rotating axle bears upon a series of rollers within a circular chamber; and my invention consists in providing the chamber with shoulders and in closing the ends of the chamber by means of the wheels carried by the axle, so as to confine the rollers in their place, as fully set forth hereinafter.

My invention also consists in the arrangement, in connection with the above-described parts, of an oil-cup.

In the drawings, Figure 1 is a longitudinal section of a head, shaft, wheels, and oil-cup, specially illustrating the arrangement of the oil-cup and one form of shaft. Fig. 2 is a longitudinal section illustrating the construction of the head in connection with a shouldered axle, wheels, and oil-cup. Fig. 3 is a perspective view of a skate embodying my invention.

A is the shaft or axle, and C is the head cylinder or bracket through which the shaft extends, the said head C being shown as cylindrical in form, and being bored through for the passage of the shaft, the bore being greater in diameter than the diameter of the shaft, and being enlarged at the ends to form annular shoulders s. To the opposite ends of the shaft are secured the wheels B, the sides of which are close to the ends of the cylinder C, and so that the wheels close the bore in the said cylinder, and in the enlarged portions of the said bore are arranged friction-rollers C', which have their bearing upon the shaft and upon the inside face of the bore, and which are confined between the shoulders s and the sides of the wheels, as will be readily understood from an examination of the drawings. As the shaft revolves it turns free from contact with any stationary bearing, resting wholly upon the rollers, which travel with it and around it in the enlarged portions of the bore, whereby the shaft is permitted to turn with the utmost freedom and with but little friction.

By the construction above described I am enabled to manufacture the bearing and retain the rollers in place without the use of the collars, caps, and other retaining appliances heretofore employed, the shoulders s preventing the rollers from moving inward, and the wheels B preventing them from moving outward, while after removing either wheel access can be had freely to either annular chamber formed by the bore and axle for the purpose of replacing or repairing or adjusting the rollers.

Each wheel is secured to the shaft, so as to turn frictionally upon the end thereof, thereby carrying the shaft as the wheel revolves, but permitting the wheel to move upon the shaft slower or faster than the latter, as is necessary in turning curves when one wheel turns faster than the other.

In order to maintain the wheels in proper position upon the axle or shaft, and avoid binding them against the ends of the cylinder C in securing them frictionally to the shaft, I prefer to provide the latter with reduced ends, forming shoulders w, against which the sides of the wheels bear, washers a being inserted between the wheels and the shoulders to prevent wear. It is not necessary in all cases to provide the axle or shaft with shoulders w, as it may be plain throughout, as shown in Fig. 1, and the wheels may be retained upon the axle by a pin, p, at each end, or by a head at one end and a pin at the other.

The annular chamber y, formed between the axle and the inner face of the cylinder C, constitutes an oil reservoir or channel, permitting the oil to pass freely to the anti-friction rollers. As, however, the oil would be supplied too freely if the said channel or reservoir was maintained full at all times, I provide the head or cylinder C with an oil-cup, D, having a screw-stopper and an opening communicating with the channel y, but arranged below the level of the latter, so that the greater portion of the oil, when the skate is in a horizontal position, will flow to and be retained in the oil-cup, but so that upon inclining the skate the oil will be directed into the channel y.

I do not here claim a head or cylinder bored through from one side to the other, receiving an axle and rollers, and closed at the ends by wheels upon the axle; nor do I here claim the specific arrangement and construction of parts shown in Fig. 1, the same forming the subject-matter of my application No. 160,745.

I claim—

1. The combination of an axle carrying at the ends rollers held frictionally thereon and a cylinder having a bore larger than the axle enlarged at the ends to form annular shoulders, and anti-friction rollers confined between said shoulders and the sides of the wheels, substantially as set forth.

2. The combination of the head or cylinder C, having a longitudinal bore enlarged at the ends, an axle extending through the said bore without contact provided with shoulders $w$ and carrying wheels frictionally confined on the ends and arranged to close the open ends of the bore, substantially as set forth.

3. The combination of the head C, having a bore extending from end to end, axle extending through the said bore without contact with the face thereof and carrying wheels B B, anti-friction rolls, and oil-cup communicating with the said bore and arranged below the level thereof, substantially as and for the purpose described.

JAMES E. EVANS.

Attest:
JNO. W. STREHLI,
JNO. H. DAVIS.